United States Patent [19]

Gabriel

[11] Patent Number: 4,737,054

[45] Date of Patent: Apr. 12, 1988

[54] APPARATUS FOR RETRACTING THE TOOL ON A MACHINE

[75] Inventor: Marty Gabriel, Castres, France

[73] Assignee: Regie Nationale des Usines Renault, Boulogne-Billancourt, France

[21] Appl. No.: 474,732

[22] Filed: Mar. 14, 1983

Related U.S. Application Data

[63] Continuation of Ser. No. 296,304, Aug. 26, 1981, abandoned, which is a continuation of Ser. No. 917,364, Jun. 20, 1978, abandoned.

[30] Foreign Application Priority Data

Jun. 27, 1977 [FR] France .............................. 77 19614

[51] Int. Cl.$^4$ ........................... B23C 1/02; B23B 39/00
[52] U.S. Cl. ...................................... 409/165; 408/62; 408/241 R; 409/231
[58] Field of Search ............... 409/134, 165, 166, 231; 29/56.5, 26 A; 408/62, 79, 147, 241 R; 308/3 A; 82/1.2; 384/114

[56] References Cited

U.S. PATENT DOCUMENTS

| 2,642,759 | 6/1953 | Woerner ........................ 408/241 R |
| 3,438,288 | 4/1969 | Kaiser ............................ 409/231 X |
| 3,466,951 | 9/1969 | Greenberg ........................ 409/165 |
| 3,466,952 | 9/1969 | Greenberg et al. ................ 408/147 |

FOREIGN PATENT DOCUMENTS

| 2061987 | 7/1971 | Fed. Rep. of Germany ........ 408/62 |
| 1588597 | 3/1970 | France ................................. 408/62 |
| 368941 | 2/1973 | U.S.S.R. ............................... 82/1.2 |

Primary Examiner—William R. Briggs
Attorney, Agent, or Firm—Oblon, Fisher, Spivak, McClelland & Maier

[57] ABSTRACT

An apparatus for retracting the tool from a machined piece on a machine comprising a movable assembly for holding the tool or the piece having a guide means for taking up play by lateral biasing.

This apparatus involves means intended for providing lateral displacement of the said movable assembly away from its position for taking up play so as to separate the tool from the piece after machining.

For a machine tool with an indexible rotating tool-holding spindle, the tool is indexed in a plane approximately parallel to that of the means for taking up play prior to activation of the above mentioned means which is utilized to separate the tool from the piece.

5 Claims, 1 Drawing Sheet

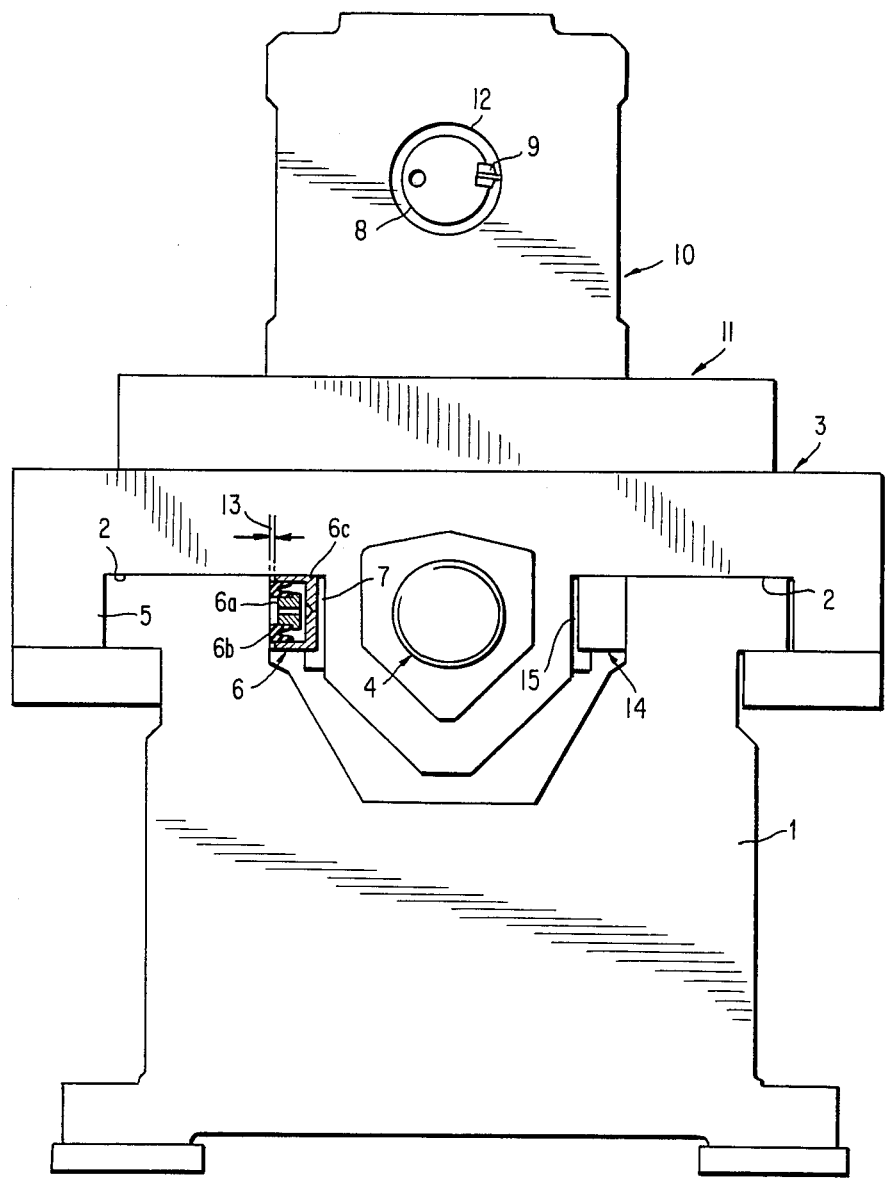

APPARATUS FOR RETRACTING THE TOOL ON A MACHINE

This application is a continuation of application Ser. No. 296,304, filed Aug. 26, 1981, abandoned, which in turn is a continuation of application Ser. No. 917,364, filed June 20, 1978, abandoned.

BACKGROUND OF THE INVENTION

1. Field of the Invention

The invention relates to the problem of retraction of the tool on a machine where it is desired, at the end of machining, to avoid scratching the machined surface during the course of piece-tool disengagement.

2. Description of the Prior Art

Prior art devices have utilized tool-retracting devices incorporated in each tool holder or its particular support.

SUMMARY OF THE INVENTION

The present invention has for an object a solution utilizing an existing machine component.

Essentially, in a machine with a movable assembly for the support of the tool or the piece, and having guidance means for taking up play by lateral biasing, there has been provided an apparatus for retraction of the tool characterized by the fact that it has means intended for displacing the movable assembly laterally away from its position for taking up play so as to separate the tool from the piece after machining.

Such a solution is particularly advantageous on machines with a tool-holding spindle for machining inside borings, for example, where the spindle is manually indexible or can be subjected to an angularly indexible stop device at the end of machining. It suffices then to provide tool indexing in a plane approximately parallel to that of the means for taking up play mentioned above and in the same direction prior to activating the means utilized for separating the tool from the piece.

It is apparent that in this case the apparatuses for tool retraction are not readily incorporated in tool-holding spindles and constitute a costly solution in comparison with the object of the invention.

In particular, in a machine with guiding means for taking up play by pneumatic drivers, the means for separating the tool or tools from the piece may simply consist of penumatic drivers opposed to the preceding ones and activatable in their place.

BRIEF DESCRIPTION OF THE DRAWINGS

Various other objects, features and attendant advantages of the present invention will be more fully appreciated as the same becomes better understood from the following detailed description when considered in connection with the accompanying drawing.

FIG. 1 is an end view in partial cross section of a machine tool with an apparatus for taking up play and retracting the tool pneumatically.

DETAILED DESCRIPTION OF THE PREFERRED EMBODIMENT

The machine tool represented comprises a pedestal 1 provided with horizontal guides 2 on which a sliding table 3 is mounted, which is driven through a screw mechanism 4 on the pedestal, engaging a threaded hole in the table.

A vertical side of the table 3, moreover, is guided laterally on the side 5 of one of the guides 2 against which the side of the table is kept pressed by an apparatus for taking up the play, here constituted by at least two pneumatic drivers 6, disposed at a distance from one another on the pedestal 1, facing a lateral guide 7 on the table 3 with which they cooperate by friction. Each driver 6, as shown in section in the drawing, comprises an outlet 6a from a compressed air line, not shown, incorporated in the adjacent part of the pedestal and, around this outlet a ring seal 6b on which a driver head 6c can slide.

The machine tool considered here is a boring machine, the rotating tool-holding spindle of which is represented as 8 with its boring tool 9. The motor-driven holder-spindle, not shown, which can have an angular indexing device for the spindle which can be of any known type, is attached to the table 3, while the piece 10 to be machined is held for machining on a slab 11 integral with the pedestal 1, the machining here consisting of a boring operation for making a hole 12 in the piece 10.

It will be noted that the driver head 6c of each pneumatic driver 6 is, in its position for taking up the play between the side of the table and the side 5, separated from the pedestal 1 by a slight play 13 which can be of the order of several tenths of a millimeter.

Opposite the drivers 6 are likewise disposed pneumatic drivers 14 identically fed with compressed air via a line, not shown, incorporated in the adjacent part of the pedestal 1, these drivers cooperating with a lateral slide 15 on the table.

Thus, it is easily seen that at the end of a machining operation, to achieve a retraction of the tool 9 with respect to the piece 10 before withdrawal of the tool-holding spindle 8 from the bored hole 12, it suffices to index the tool 9 to the angular position shown in the drawing close to the horizontal and oriented in the sense of the lateral biasing for taking up play, then to feed compressed air to the pneumatic drivers 14 while those for taking up play 6 are opened to the exhaust, so that the combination of table 3, spindle, and toolholder 8, 9 is shifted by the amount of the play 13 in the opposite direction from the position of the tool 9, and so that the latter is then shifted with respect to the bored hole 12 out of which it and the spindle can be withdrawn without risk of scratching the finished boring.

For the machining of the next piece, the pneumatic feed to the drivers 6, 14 is again reversed before machining and so forth and so on.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for retraction of a tool from a machined piece, comprising:
   a fixed pedestal, said pedestal having at least one horizontal sliding surface;
   a sliding table having at least one horizontal sliding surface in sliding surface contact with said at least one horizontal sliding surface of said pedestal;
   means for rectilinearly driving said sliding table in a first horizontal direction;

means for supporting said piece on one of said pedestal and said sliding table;

means for supporting said tool on the other of said pedestal and said sliding table;

means for rotating said tool about an axis parallel with said first direction, whereby said piece and tool may be relatively advanced and retracted in said first direction during a machining operation;

a first vertical surface of said pedestal extending parallel to said first direction;

a second vertical surface of said sliding table extending parallel to said first direction and facing said first vertical surface to define a first gap;

a third vertical surface of said pedestal extending parallel to said first direction;

a fourth vertical surface of said sliding table extending parallel to said first direction and facing said third vertical surface to define a second gap;

first linear fluid motor means in said first gap and in contact with said first and second surfaces, said first fluid motor means being expandable in a first directional sense of a secnd horizontal direction transverse to said first direction to enlarge said first gap and reduce said second gap;

first stop means on said pedestal and said sliding table for limiting said expansion by said first motor means, whereby lateral play in said second direction between said pedestal and said sliding table, during rectilinear movement of said sliding table in said first direction, may be eliminated;

second linear fluid motor means in said second gap and in contact with said third and fourth surfaces, said second fluid motor means being expandable in a second directional sense of said second direction to enlarge said second gap and reduce said first gap; and second stop means on said pedestal and said sliding table for limiting expansion by said second motor means, whereby said tool may be retracted from said piece.

2. The apparatus of claim 1 including means for selectively operating alternate ones of said first and second fluid motor means while deactivating the other of said fluid motor means.

3. An apparatus for retraction of a tool from a machined piece, comprising:

a first assembly rotatably supporting said tool about an axis;

a second assembly supporting said piece, said first and second assemblies being relatively movable by a rectilinear displacement parallel to said axis and having a play in a plane therebetween which is in a direction lateral to said rectilinear displacement;

guiding means between said first and second assemblies for guiding one of said assemblies for said rectilinear motion, said guiding means being positioned and constructed for maintaining said one of said assemblies in a lateral position for taking up all of said play in one directional sense of said direction; and lateral displacement means spaced from said guiding means and located between said first and second assemblies, said lateral displacement means being positioned and constructed for laterally displacing said one of said assemblies away from said position for taking up all of said play in an opposite directional sense of said direction so as to separate said tool from said piece, wherein said retracting apparatus is provided with means for indexing of the tool in a plane approximately parallel to said lateral direction prior to withdrawal of the tool from the piece.

4. The apparatus of claim 3 including means for selectively operating alternate ones of said guiding means and said lateral displacement means.

5. An apparatus for retraction of the tool as in claim 3 in which the guiding means for taking up play in said one direction comprises activatable pneumatic drivers, wherein said lateral displacement means consist of identical pneumatic drivers opposed to said guiding means and activatable in their place.

* * * * *